US012632817B2

(12) United States Patent
Yu et al.

(10) Patent No.: US 12,632,817 B2
(45) Date of Patent: May 19, 2026

(54) REAL-TIME PREDICTION METHOD, ELECTRONIC DEVICE AND NON-TRANSITORY COMPUTER-READABLE STORAGE MEDIUM

(71) Applicant: Beijing Baidu Netcom Science Technology Co., Ltd., Beijing (CN)

(72) Inventors: Naisheng Yu, Beijing (CN); Yi Wang, Beijing (CN); Hongda Yue, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 750 days.

(21) Appl. No.: 17/973,776

(22) Filed: Oct. 26, 2022

(65) Prior Publication Data

US 2023/0359976 A1 Nov. 9, 2023

(30) Foreign Application Priority Data

May 5, 2022 (CN) .......................... 202210482906.6

(51) Int. Cl.
*G06Q 10/067* (2023.01)
*G06Q 10/04* (2023.01)

(52) U.S. Cl.
CPC ........... *G06Q 10/067* (2013.01); *G06Q 10/04* (2013.01)

(58) Field of Classification Search
CPC .............................. G06Q 10/04; G06Q 10/067
See application file for complete search history.

(56) References Cited

U.S. PATENT DOCUMENTS

| 8,370,280 B1 * | 2/2013 | Lin | ........................... G06N 5/04 |
| | | | 706/12 |
| 2013/0103615 A1 * | 4/2013 | Mun | ...................... G06Q 10/04 |
| | | | 705/36 R |

(Continued)

FOREIGN PATENT DOCUMENTS

| CN | 109242514 A | 1/2019 |
| CN | 111860853 A | 10/2020 |

(Continued)

OTHER PUBLICATIONS

Julia Sack and Tarunraj Singh, "Automated Design of Model Predictive Controllers", Proceedings of the American Control Conference, pp. 3758-3762, Jun. 2000 (Year: 2000).*

(Continued)

*Primary Examiner* — Andrew Chase Lakhani
(74) *Attorney, Agent, or Firm* — Moore & Van Allen PLLC

(57) ABSTRACT

Provided are a real-time prediction method, an electronic device and a non-transitory computer-readable storage medium, which relate to the field of data processing, and in particular to the field of artificial intelligence. The specific implementation solution is acquiring a user request based on a business scenario; acquiring, from a plurality of pre-stored original features, at least one target original feature corresponding to the user identifier; determining, from a plurality of pre-trained models, a target model corresponding to the scenario identifier, and determining, from a plurality of feature engineering services, a target feature engineering service corresponding to the target model; performing real-time feature processing on the at least one target original feature by means of the target feature engineering service, so as to obtain a target model entry feature; and inputting the target model entry feature into the target model.

17 Claims, 7 Drawing Sheets

(56)  References Cited

U.S. PATENT DOCUMENTS

| | | | | |
|---|---|---|---|---|
| 2015/0170053 A1* | 6/2015 | Miao | ..................... | G06N 20/00 |
| | | | | 706/12 |
| 2017/0126709 A1* | 5/2017 | Baradaran | ........... | H04L 63/1441 |
| 2018/0060738 A1* | 3/2018 | Achin | .................... | G06N 20/00 |
| 2019/0378074 A1* | 12/2019 | Mcphatter | ........... | G06Q 10/067 |
| 2020/0342384 A1 | 10/2020 | Iyer | | |
| 2020/0356839 A1* | 11/2020 | Tocornal | ................ | G06N 3/044 |
| 2021/0097477 A1* | 4/2021 | Zhang | ................... | G01N 21/90 |
| 2022/0076164 A1* | 3/2022 | Conort | ................... | G06N 20/00 |

FOREIGN PATENT DOCUMENTS

| | | | | | |
|---|---|---|---|---|---|
| CN | | 111949708 A | 11/2020 | | |
| CN | | 112633567 A | 4/2021 | | |
| CN | | 113688313 A | 11/2021 | | |
| WO | WO-2018144897 A1 * | 8/2018 | ........... | G06Q 10/067 | |

OTHER PUBLICATIONS

The First Search Report of counterpart CN priority application No. 202210482906.6 was issued on May 24, 2023.
The Supplemental Search Report of counterpart CN priority application No. 202210482906.6 was issued on Jul. 24, 2023.

* cited by examiner

Fig. 2

```
┌──────────────┐     ┌──────────┐     ┌──────────┐     ┌──────────────┐     ┌──────────────┐
│   Original   │     │ Feature  │     │ Feature  │     │ Milling value│     │   Feature    │
│feature cluster│───▶│ encoding │───▶│conversion│───▶│   filling    │───▶│normalization │
│      A       │     │          │     │          │     │              │     │              │
└──────────────┘     └──────────┘     └──────────┘     └──────────────┘     └──────────────┘
                                                                                    │
                                                                                    ▼
┌──────────────┐     ┌──────────┐     ┌──────────────┐                      ┌──────────────┐
│ Model entry  │     │ Feature  │     │   Embedded   │                      │   Feature    │
│  feature B   │◀───│  onehot  │◀───│   feature    │◀────────────────────│   binning    │
│              │     │ encoding │     │  selection   │                      │              │
└──────────────┘     └──────────┘     └──────────────┘                      └──────────────┘
```

Fig. 3

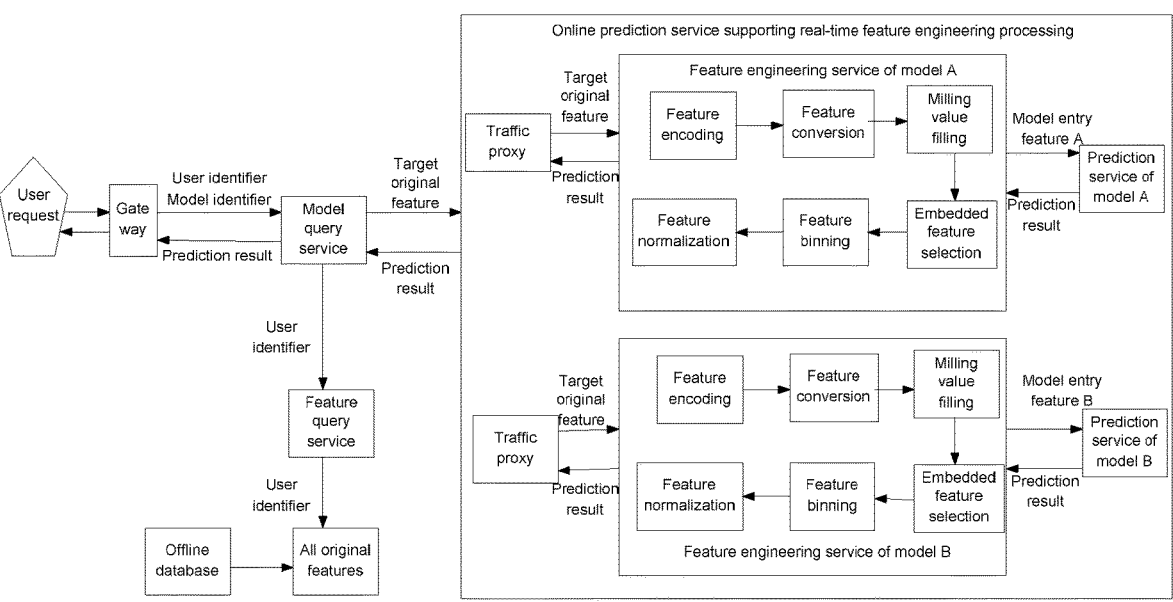

REAL-TIME PREDICTION METHOD, ELECTRONIC DEVICE AND NON-TRANSITORY COMPUTER-READABLE STORAGE MEDIUM

CROSS-REFERENCE TO RELATED APPLICATIONS

The present disclosure claims priority of Chinese Patent Application No. 202210482906.6, filed on May 5, 2022, titled "Real-Time Prediction Method and Apparatus, Electronic Device and Computer Program Product". The present disclosure hereby incorporates by reference the disclosure of Chinese Patent Application No. 202210482906.6 in its entirety.

TECHNICAL FIELD

The present disclosure relates to the field of data processing, particularly relates to the field of artificial intelligence, and specifically relates to a real-time prediction method, an electronic device and a non-transitory computer-readable storage medium.

BACKGROUND OF THE INVENTION

In a traditional online prediction process, before calling an online prediction service, it is usually necessary to perform offline feature processing on original features in advance, so as to generate model entry features, and then all original features and all generated model entry features are stored in a server. In order to ensure that the demands of all users are met, even model entry features that are used by a small number of users need to be generated in advance and are stored in a database of the server.

However, if all original features and model entry features are stored, huge storage resources are occupied, and meanwhile, a huge test is brought to the query timeliness of a storage engine.

SUMMARY OF THE INVENTION

The present disclosure provides a real-time prediction method, an electronic device and a non-transitory computer-readable storage medium, so as to at least solve the problem of excessive storage pressure caused by pre-storing a large number of model entry features during online prediction in the prior art.

According to one aspect of the present disclosure, a real-time prediction method is provided, including acquiring a user request based on a business scenario, wherein the user request at least includes a user identifier and a scenario identifier of the business scenario; acquiring, from a plurality of pre-stored original features, at least one target original feature corresponding to the user identifier; determining, from a plurality of pre-trained models, a target model corresponding to the scenario identifier, and determining, from a plurality of feature engineering services, a target feature engineering service corresponding to the target model; performing real-time feature processing on the at least one target original feature by means of the target feature engineering service, so as to obtain a target model entry feature; and inputting the target model entry feature into the target model, so as to obtain a prediction result made by the target model for the user request, wherein the prediction result is used for representing whether the user request meets a preset business condition in the business scenario.

As at least one alternative embodiment, the real-time prediction method further includes: before determining, from the plurality of pre-trained models, the target model corresponding to the scenario identifier, and determining, from the plurality of feature engineering services, the target feature engineering service corresponding to the target model, acquiring a plurality of historical feature sets, wherein one historical feature set corresponds to one business scenario, and each historical feature set is composed of a plurality of historical original features; performing training according to each historical feature set, so as to obtain a model corresponding to each business scenario, and storing the model in a first file; performing coding processing on the generation process of model entry features, so as to obtain a feature engineering service corresponding to each model, and storing the feature engineering service in a second file, wherein the model entry feature is a feature generated according to each historical feature set, and there is a corresponding relationship between the first file and the second file; and on the basis of the first file and the second file, deploying the feature engineering service corresponding to each model and each model in a server, so as to generate an online prediction service.

As at least one alternative embodiment, the real-time prediction method further includes: acquiring first mirror image information from a preset mirror image storage area, wherein the first mirror image information at least includes a plurality of execution instructions for generating the online prediction service; generating a deployment task of the online prediction service according to the first mirror image information; and according to the deployment task, the first file and the second file, deploying each model and the feature engineering service corresponding to each model in the server in a one-to-one correspondence manner, so as to generate the online prediction service.

As at least one alternative embodiment, the real-time prediction method further includes: acquiring the first file, the second file, and the corresponding relationship between the first file and the second file; acquiring second mirror image information and third mirror image information from the preset mirror image storage area according to the deployment task, wherein the second mirror image information represents a feature engineering service deployment mirror image, and the third mirror image information represents a model deployment mirror image; parsing the first file according to the second mirror image information, so as to obtain the feature engineering service corresponding to each model; parsing the second file according to the third mirror image information, so as to obtain each model; and deploying, according to the corresponding relationship, each model and the feature engineering service corresponding to each model in the server in the one-to-one correspondence manner, so as to generate the online prediction service.

As at least one alternative embodiment, the real-time prediction method further includes: detecting an execution duration of the deployment task; and when the execution duration of the deployment task is greater than a preset duration, determining that the generation of the online prediction service fails.

As at least one alternative embodiment, the real-time prediction method further includes: performing feature encoding on the target original feature by means of the target feature engineering service, so as to obtain a first feature; performing feature conversion on the first feature to obtain a second feature; performing missing value filling on the basis of the second feature to obtain a third feature; performing feature normalization processing on the third feature to obtain a fourth feature; performing feature binning on the fourth feature to obtain a fifth feature; and performing embedded feature selection on the fifth feature to obtain the target model entry feature.

As at least one alternative embodiment, the real-time prediction method further includes: after inputting the target model entry feature into the target model, so as to obtain the prediction result made by the target model for the user request, when the user request meets the preset business condition in the business scenario, determining to execute the user request; and when the user request does not meet the preset business condition in the business scenario, determining to refuse to execute the user request.

As at least one alternative embodiment, the real-time prediction method further includes: after inputting the target model entry feature into the target model, so as to obtain the prediction result made by the target model for the user request, when the user request meets the preset business condition in the business scenario, pushing the information of a target product to a terminal device; and when the user request does not meet the preset business condition in the business scenario, prohibiting to push the information of the target product to the terminal device.

According to one aspect of the present disclosure, an electronic device is provided, including at least one processor; and a memory in communication connection with the at least one processor, wherein the memory stores an instruction executable by the at least one processor, and the instruction is executed by the at least one processor, such that the at least one processor may execute the following actions: acquiring a user request based on a business scenario, wherein the user request at least includes a user identifier and a scenario identifier of the business scenario; acquiring, from a plurality of pre-stored original features, at least one target original feature corresponding to the user identifier; determining, from a plurality of pre-trained models, a target model corresponding to the scenario identifier, and determining, from a plurality of feature engineering services, a target feature engineering service corresponding to the target model; performing real-time feature processing on the at least one target original feature by means of the target feature engineering service, so as to obtain a target model entry feature; and inputting the target model entry feature into the target model, so as to obtain a prediction result made by the target model for the user request, wherein the prediction result is used for representing whether the user request meets a preset business condition in the business scenario.

As at least one alternative embodiment, before determining, from the plurality of pre-trained models, the target model corresponding to the scenario identifier, and determining, from the plurality of feature engineering services, the target feature engineering service corresponding to the target model, the method further includes: acquiring a plurality of historical feature sets, wherein one historical feature set corresponds to one business scenario, and each historical feature set is composed of a plurality of historical original features; performing training according to each historical feature set, so as to obtain a model corresponding to each business scenario, and storing the model in a first file; performing coding processing on generation process of model entry features, so as to obtain a feature engineering service corresponding to each model, and storing the feature engineering service in a second file, wherein the model entry feature is a feature generated according to each historical feature set, and there is a corresponding relationship between the first file and the second file; and on the basis of the first file and the second file, deploying the feature engineering service corresponding to each model and each model in a server, so as to generate an online prediction service.

As at least one alternative embodiment, the step of on the basis of the first file and the second file, deploying the feature engineering service corresponding to each model and each model in the server, so as to generate the online prediction service includes: acquiring first mirror image information from a preset mirror image storage area, wherein the first mirror image information at least includes a plurality of execution instructions for generating a online prediction service; generating a deployment task of the online prediction service according to the first mirror image information; and according to the deployment task, the first file and the second file, deploying each model and the feature engineering service corresponding to each model in the server in a one-to-one correspondence manner, so as to generate the online prediction service.

As at least one alternative embodiment, the step of according to the deployment task, the first file and the second file, deploying each model and the feature engineering service corresponding to each model in the server in the one-to-one correspondence manner, so as to generate the online prediction service includes: acquiring the first file, the second file, and the corresponding relationship between the first file and the second file; acquiring second mirror image information and third mirror image information from the preset mirror image storage area according to the deployment task, wherein the second mirror image information represents a feature engineering service deployment mirror image, and the third mirror image information represents a model deployment mirror image; parsing the first file according to the second mirror image information, so as to obtain the feature engineering service corresponding to each model; parsing the second file according to the third mirror image information, so as to obtain each model; and deploying, according to the corresponding relationship, each model and the feature engineering service corresponding to each model in the server in the one-to-one correspondence manner, so as to generate the online prediction service.

As at least one alternative embodiment, the method further includes: detecting an execution duration of the deployment task; and when the execution duration of the deployment task is greater than a preset duration, determining that the generation of the online prediction service fails.

As at least one alternative embodiment, the step of performing real-time feature processing on the at least one target original feature by means of the target feature engineering service, so as to obtain the target model entry feature includes: performing feature encoding on the target original feature by means of the target feature engineering service, so as to obtain a first feature; performing feature conversion on the first feature to obtain a second feature; performing missing value filling on the basis of the second feature to obtain a third feature; performing feature normalization processing on the third feature to obtain a fourth feature; performing feature binning on the fourth feature to obtain a fifth feature; and performing embedded feature selection on the fifth feature to obtain the target model entry feature.

As at least one alternative embodiment, after inputting the target model entry feature into the target model, so as to obtain the prediction result made by the target model for the user request, the method further includes: when the user request meets the preset business condition in the business scenario, determining to execute the user request; and when the user request does not meet the preset business condition in the business scenario, determining to refuse to execute the user request.

As at least one alternative embodiment, after inputting the target model entry feature into the target model, so as to obtain the prediction result made by the target model for the user request, the method further includes: when the user request meets the preset business condition in the business scenario, pushing the information of a target product to a terminal device; and when the user request does not meet the preset business condition in the business scenario, prohibiting to push the information of the target product to the terminal device.

According to one aspect of the present disclosure, a non-transitory computer-readable storage medium storing a computer instruction is provided, wherein the computer instruction is used for causing a computer to execute following actions: acquiring a user request based on a business scenario, wherein the user request at least includes a user identifier and a scenario identifier of the business scenario; acquiring, from a plurality of pre-stored original features, at least one target original feature corresponding to the user identifier; determining, from a plurality of pre-trained models, a target model corresponding to the scenario identifier, and determining, from a plurality of feature engineering services, a target feature engineering service corresponding to the target model; performing real-time feature processing on the at least one target original feature by means of the target feature engineering service, so as to obtain a target model entry feature; and inputting the target model entry feature into the target model, so as to obtain a prediction result made by the target model for the user request, wherein the prediction result is used for representing whether the user request meets a preset business condition in the business scenario.

As at least one alternative embodiment, before determining, from the plurality of pre-trained models, the target model corresponding to the scenario identifier, and determining, from the plurality of feature engineering services, the target feature engineering service corresponding to the target model, the method further includes: acquiring a plurality of historical feature sets, wherein one historical feature set corresponds to one business scenario, and each historical feature set is composed of a plurality of historical original features; performing training according to each historical feature set, so as to obtain a model corresponding to each business scenario, and storing the model in a first file; performing coding processing on generation process of model entry features, so as to obtain a feature engineering service corresponding to each model, and storing the feature engineering service in a second file, wherein the model entry feature is a feature generated according to each historical feature set, and there is a corresponding relationship between the first file and the second file; and on the basis of the first file and the second file, deploying the feature engineering service corresponding to each model and each model in a server, so as to generate an online prediction service.

As at least one alternative embodiment, the step of on the basis of the first file and the second file, deploying the feature engineering service corresponding to each model and each model in the server, so as to generate the online prediction service includes: acquiring first mirror image information from a preset mirror image storage area, wherein the first mirror image information at least includes a plurality of execution instructions for generating a online prediction service; generating a deployment task of the online prediction service according to the first mirror image information; and according to the deployment task, the first file and the second file, deploying each model and the feature engineering service corresponding to each model in the server in a one-to-one correspondence manner, so as to generate the online prediction service.

As at least one alternative embodiment, the step of according to the deployment task, the first file and the second file, deploying each model and the feature engineering service corresponding to each model in the server in the one-to-one correspondence manner, so as to generate the online prediction service includes: acquiring the first file, the second file, and the corresponding relationship between the first file and the second file; acquiring second mirror image information and third mirror image information from the preset mirror image storage area according to the deployment task, wherein the second mirror image information represents a feature engineering service deployment mirror image, and the third mirror image information represents a model deployment mirror image; parsing the first file according to the second mirror image information, so as to obtain the feature engineering service corresponding to each model; parsing the second file according to the third mirror image information, so as to obtain each model; and deploying, according to the corresponding relationship, each model and the feature engineering service corresponding to each model in the server in the one-to-one correspondence manner, so as to generate the online prediction service.

In the technical solutions of the present disclosure, a manner of placing the processing process of generating the target model entry feature in an online prediction stage is utilized in the present disclosure, the user request based on the business scenario is acquired, at least one target original feature corresponding to the user identifier is acquired from the plurality of pre-stored original features, then the target model corresponding to the scenario identifier is determined from the plurality of pre-trained models, the target feature engineering service corresponding to the target model is determined from the plurality of feature engineering services, finally, real-time feature processing is performed on the at least one target original feature by means of the target feature engineering service, so as to obtain the target model entry feature, and the target model entry feature is input into the target model, so as to obtain the prediction result made by the target model for the user request. The user request at least includes the user identifier and the scenario identifier of the business scenario; and the prediction result is used for representing whether the user request meets the preset business condition in the business scenario.

It can be seen from the above content that, in the present disclosure, after receiving the user request, the model entry feature will not be directly called, but the target original feature corresponding to the user identifier is acquired according to the user request, and then according to the target original feature, the target original feature is processed in real time by means of the target feature engineering service, so as to obtain the target model entry feature. Therefore, in the present disclosure, it is only necessary to store the original features in advance, and it is not necessary to store a large number of model entry features, thereby reducing the storage pressure of the server. Moreover, for model entry features corresponding to smaller user groups, by means of the solutions of the present disclosure, it is also not necessarily to store the model entry features in advance, but the corresponding target model entry features are generated in real time after receiving the user request, thereby not only ensuring the demands of this part of user groups, but also avoiding the waste of storage resources. In addition, compared with the prior art, since there is no need to store all model entry features in advance in the present disclosure, the query timeliness of a storage engine can also be improved while the pressure on the storage engine is reduced.

Therefore, by means of the technical solutions of the present disclosure, the purpose of automatically generating the model entry features in the online prediction stage is realized, thereby realizing the effects of reducing the storage pressure and storage cost of the server, and thus solving the problem of excessive storage pressure caused by pre-storing a large number of model entry features during online prediction in the prior art.

BRIEF DESCRIPTION OF THE SEVERAL VIEWS OF THE DRAWINGS

The drawings are used for better understanding of the present solution, and do not constitute limitations to the present disclosure.

FIG. 2 is a schematic diagram of a feature processing process according to Embodiment 1 of the present disclosure;

FIG. 3 is a flow diagram of a real-time prediction method according to Embodiment 1 of the present disclosure;

DETAILED DESCRIPTION OF THE INVENTION

Exemplary embodiments of the present disclosure are described below in combination with the drawings, which include various details of the embodiments of the present disclosure to facilitate understanding, and should be considered as exemplary only. Accordingly, those of ordinary skill in the art should be aware that, various changes and modifications may be made to the embodiments described herein without departing from the scope and spirit of the present disclosure. Similarly, for clarity and conciseness, descriptions of well-known functions and structures are omitted from the following descriptions.

It should be noted that, the terms "first" and "second" and the like in the specification, claims and the above drawings of the present disclosure are used for distinguishing similar objects, and are not necessarily used for describing a specific sequence or precedence order. It should be understood that the data used in this way may be interchanged under appropriate circumstances, so that the embodiments of the present disclosure described herein may be implemented in a sequence other than those illustrated or described herein. In addition, the terms "include" and "have", and any variations thereof are intended to cover non-exclusive inclusions, for example, processes, methods, systems, products or devices including a series of steps or units are not necessarily limited to those clearly listed steps or units, but may include other steps or units that are not clearly listed or are inherent to these processes, methods, products or devices.

In the technical solutions of the present disclosure, the acquisition, storage and application of personal information of a user involved are all in compliance with the provisions of relevant laws and regulations, and do not violate public orders and good customs.

Embodiment 1

According to the embodiment of the present disclosure, an embodiment of a real-time prediction method is provided. It should be noted that, the steps shown in the flow diagram of the drawings may be executed in a computer system, such as a group of computer-executable instructions. Moreover, although a logical sequence is shown in the flow diagram, in some cases, steps shown or described may be executed in a sequence different from that herein.

Figure 1:
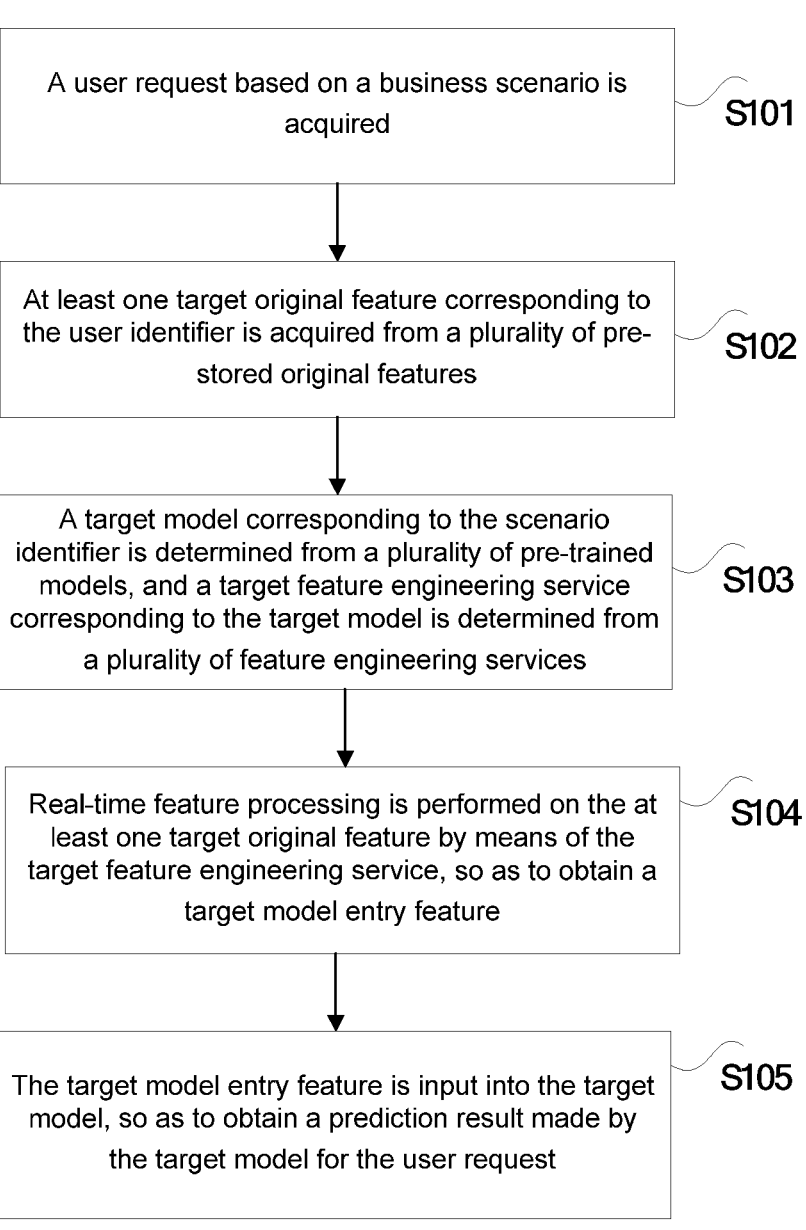
FIG. 1 is a flow diagram of a real-time prediction method according to Embodiment 1 of the present disclosure.

FIG. 1 is a flow diagram of a real-time prediction method according to an embodiment of the present disclosure. As shown in FIG. 1, the method includes the following steps:

Step S101, a user request based on a business scenario is acquired.

In step S101, the user request at least includes a user identifier and a scenario identifier of the business scenario. The user request may be sent by a terminal device, the terminal device may be a smartphone, a smart tablet computer, a notebook computer, a desktop computer and other devices used by a user, the business scenario at least includes a marketing scenario, a financial loan scenario, a credit card application scenario and other scenarios, and the user request may be a request that is generated by the user on the terminal device by completing operations such as clicking on a webpage link, browsing an advertisement page, and filling in application information. In addition, the user identifier may be an identifier of user information such as the name, age, occupation and income of the user, and may also be an identifier of user behaviors such as a default record and a criminal record of the user.

Step S102, at least one target original feature corresponding to the user identifier is acquired from a plurality of pre-stored original features.

In step S102, a plurality of original features are pre-stored in a server, wherein the plurality of original features may be understood as all original features, and these original features may be used for representing information such as user portraits of various users. For example, for the user request initiated by a user A, by means of the user identifier of the user A, the server may find the target original feature closest to the user A according to the user identifier, wherein there may be a plurality of target original features.

Step S103, a target model corresponding to the scenario identifier is determined determining from a plurality of pre-trained models, and a target feature engineering service corresponding to the target model is determined from a plurality of feature engineering services.

In step S103, a plurality of pre-trained models are stored in the server, wherein these models are obtained by training based on different business scenarios, for example, a model A corresponds to a financial loan scenario, a model B corresponds to a credit card application scenario, and a model C corresponds to a marketing scenario. By means of the scenario identifier in the user request, the server may determine a model identifier corresponding to the scenario identifier, and the model identifier may represent the target model corresponding to the business scenario. In addition, in the server, a feature engineering service is also correspondingly deployed on the basis of each model, wherein the feature engineering service may be understood as a program obtained by performing coding processing on the generation process of model entry features, and automatic feature processing may be performed on the original features by means of the feature engineering service, so as to obtain corresponding model entry features.

Step S104, real-time feature processing is performed on the at least one target original feature by means of the target feature engineering service, so as to obtain a target model entry feature.

In step S104, as shown in FIG. 2, the process of feature processing at least includes: feature encoding, feature conversion, missing value filling, feature normalization, feature binning, embedded feature selection, and feature onehot (one-bit valid encoding) encoding and other processing processes. As shown in FIG. 2, after the above feature processing is performed on an original feature cluster A (which represents a plurality of original features corresponding to the user A) in sequence, a target model entry feature B is finally generated. In addition, in the server, one model corresponds to one feature engineering service, and each feature engineering service is used for generating one model entry feature. For example, for the user A, the server acquires the original feature cluster A (which represents a plurality of original features corresponding to the user A) according to a user identifier 1 of the user A, then determines a target model B according to a scenario identifier A, and calls a target feature engineering service B corresponding to the target model B to process the original feature cluster A, so as to generate a target model entry feature B; and for the user C, the server acquires an original feature cluster C (which represents a plurality of original features corresponding to the user C) according to a user identifier 2 of the user C, then determines a target model D according to a scenario identifier C, and calls a target feature engineering service D corresponding to the target model D to process the original feature cluster C, so as to generate a target model entry feature D.

Step S105, the target model entry feature is input into the target model, so as to obtain a prediction result made by the target model for the user request.

In step S105, the prediction result is used for representing whether the user request meets a preset business condition in the business scenario. For example, in the business scenario of credit card application, the preset business condition is a minimum credit score, and after the target model entry feature is input into the target model, the prediction result may be that the credit score of the user is lower than a preset minimum credit score, or the credit score of the user is greater than the preset minimum credit score.

In addition, FIG. 3 is a flow diagram of a real-time prediction method according to Embodiment 1 of the present disclosure. As shown in FIG. 3, the user sends a user request to a server by means of a terminal device, and the user request enters the server by means of a gateway, wherein the user request includes a scenario identifier and a user identifier, and the scenario identifier is associated with a model identifier. After receiving the user request, the server call a model query service, and then obtains at least one target original feature by querying from a plurality of pre-stored original features according to the user identifier, wherein the original features may be stored in an offline database of the server. After obtaining the at least one target original feature by query, the server determines, by means of the model identifier, a target model and a target feature engineering service corresponding to the target model, and then transmits the target original feature to the target feature engineering service in a traffic proxy manner. The target feature engineering service performs real-time feature engineering processing on the target original feature, so as to generate a corresponding target model entry feature, and then inputs the model entry feature into the corresponding target model, so as to form a target model prediction service. Finally, the target model prediction service may predict the user request, so as to generate a prediction result. In FIG. 3, two feature engineering services are shown, that is, a feature engineering service of model A for generating a model entry feature A and a feature engineering service of model B for generating a model entry feature B. Correspondingly, FIG. 3 also shows two model prediction services, that is, a prediction service of model A and a prediction service of model B. The feature processing process at least includes: feature encoding, feature conversion, missing value filling, feature normalization processing, feature binning, embedded feature selection and other steps. It should be noted that, the feature engineering services and the models are pre-deployed in the server in a one-to-one correspondence manner, that is, in the server, by means of deploying a plurality of feature engineering services and models, an online prediction service that supports real-time feature engineering processing is generated.

Figure 4:
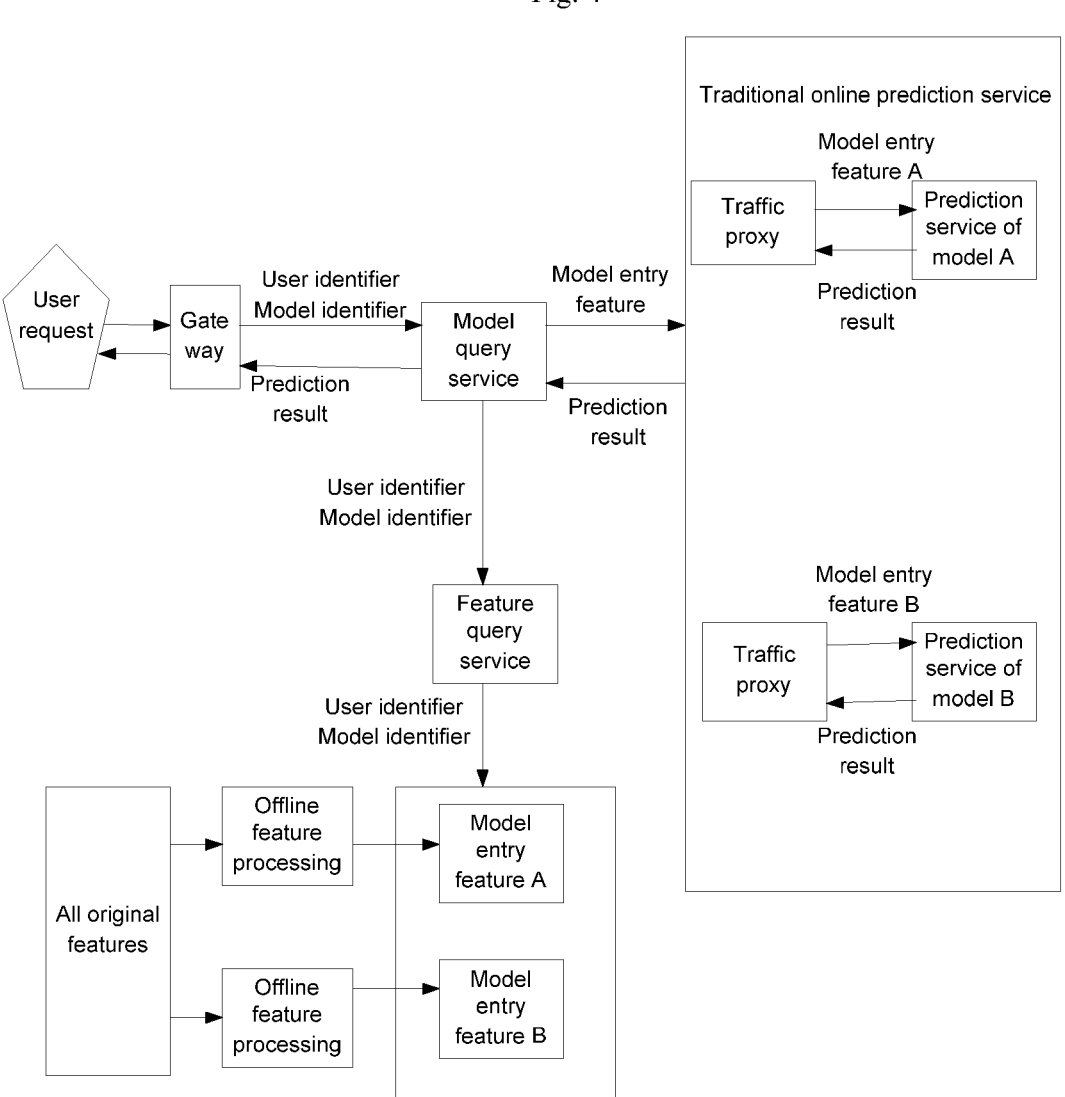
FIG. 4 is a flow diagram of a non-real-time prediction method according to the prior art.

In addition, FIG. 4 shows a flow diagram of a non-real-time prediction method according to the prior art. As shown in FIG. 4, compared with the technical solution of the present disclosure, in the prior art, the process of generating the model entry feature requires offline processing in advance, for example, the model entry feature A and the model entry feature B are respectively generated in advance according to the original features, and then all the generated model entry features and the original features need to be stored in the database in the prior art. On this basis, in the prior art, in a manner of combining the user identifier with the model identifier, the target model entry feature is directly acquired from all pre-stored model entry features, and finally the target model prediction service is generated according to the target model entry feature. For example, the model entry feature A is directly acquired as the target model entry feature, so as to generate the prediction service of model A, and the model entry feature B is directly acquired as the target model entry feature, so as to generate the prediction service of model B.

It should be noted that, according to the solution in the prior art, it is usually necessary to perform feature engineering processing on the original features in advance in a training stage before modeling, and the online prediction service can only perform model prediction, but cannot support feature engineering processing. In this case, if all original features are processed into the model entry features in advance and are stored, the following problems will be generated. First, a newly released model cannot be used in time, and it usually takes a lot of time to process the original features to convert the same into model entry features, and then the model entry features can be input into the model for prediction. Second, all the model entry features and the original features are stored in the server, which brings a huge test for the query timeliness of a storage engine. Third, excessive storage resources are wasted, real-time k-v (key-value, key-value pair storage) storage is generally based on Redis (remote dictionary server, remote dictionary server), Redis is a memory database, which is very expensive, and one model needs to correspondingly store a set of model entry features, which is undoubtedly a huge storage cost. Fourth, the use rate of the pre-processed model entry features is usually not high, and some user groups are relatively small, so there are relatively few users who will call this model, but in order to meet the calling demands of this part of users, the model entry features corresponding to this part of user groups must be stored in advance in the prior art.

By means of the solution of the present disclosure, the life cycle architecture of traditional model prediction is optimized, and the processing process of generating the model entry features according to the original features is placed in an online service prediction stage instead of in the offline training stage in the prior art. On this basis, in the present disclosure, it is only necessary to store all original features in real time instead of storing all model entry features in real time, thereby reducing the storage pressure and storage cost of the server, and improving the query timeliness of the storage engine. On the other hand, since the target model entry feature can be generated in real time directly by means of the target original feature in the present disclosure, a modeling process can be seamlessly linked with the prediction process in the present disclosure, therefore after a new model is released, the corresponding feature engineering can be directly called to generate the target model entry feature without spending a lot of time processing the original features to change the same into the model entry features. In addition, for the model entry features corresponding to smaller user groups, by means of the solution of the present disclosure, it is not necessary to store the model entry features in advance, but after receiving the user requests from these users, the corresponding target model entry features are generated in real time, thereby not only ensuring the demands of this part of user groups, but also avoiding the waste of storage resources.

As can be seen on the basis of the content of the above step S101 to step S105, in the technical solution of the present disclosure, a manner of placing the processing process of generating the target model entry feature in an online prediction stage is utilized in the present disclosure, the user request based on the business scenario is acquired, at least one target original feature corresponding to the user identifier is acquired from the plurality of pre-stored original features, then the target model corresponding to the scenario identifier is determined from the plurality of pre-trained models, the target feature engineering service corresponding to the target model is determined from the plurality of feature engineering services, finally, real-time feature processing is performed on the at least one target original feature by means of the target feature engineering service, so as to obtain the target model entry feature, and the target model entry feature is input into the target model, so as to obtain the prediction result made by the target model for the user request. The user request at least includes the user identifier and the scenario identifier of the business scenario; and the prediction result is used for representing whether the user request meets the preset business condition in the business scenario.

It can be seen from the above content that, in the present disclosure, after receiving the user request, the model entry feature will not be directly called, but the target original feature corresponding to the user identifier is acquired according to the user request, and then according to the target original feature, the target original feature is processed in real time by means of the target feature engineering service, so as to obtain the target model entry feature. Therefore, in the present disclosure, it is only necessary to store the original features in advance, and it is not necessary to store a large number of model entry features, thereby reducing the storage pressure of the server. Moreover, for the model entry features corresponding to the smaller user groups, by means of the solution of the present disclosure, it is also not necessarily to store the model entry features in advance, but the corresponding target model entry features are generated in real time after receiving the user requests of these users, thereby not only ensuring the demands of this part of user groups, but also avoiding the waste of storage resources. In addition, compared with the prior art, since there is no need to store all model entry features in advance in the present disclosure, the query timeliness of the storage engine can also be improved while the pressure on the storage engine is reduced.

Therefore, by means of the technical solution of the present disclosure, the purpose of automatically generating the model entry features in the prediction stage is realized, thereby realizing the effects of reducing the storage pressure and storage cost of the server, and thus solving the problem of excessive storage pressure caused by pre-storing a large number of model entry features during online prediction in the prior art.

Embodiment 2

In the real-time prediction method of the present disclosure, it is very important to create, in advance, a model in each business scenario and the feature engineering service corresponding to the model, wherein a set of online prediction service may be collectively formed on the basis of a plurality of models that are created on the basis of a plurality of business scenarios, and the feature engineering service corresponding to each model.

In an optional embodiment, before determining, from the plurality of pre-trained models, the target model corresponding to the scenario identifier, and determining, from the plurality of feature engineering services, the target feature engineering service corresponding to the target model, the server acquires a plurality of historical feature sets, then performs training according to each historical feature set, so as to obtain a model corresponding to each business scenario, and stores the model in a first file, subsequently performs coding processing on the generation process of model entry features, so as to obtain a feature engineering service corresponding to each model, stores the feature engineering service in a second file, and finally on the basis of the first file and the second file, deploys the feature engineering service corresponding to each model and each model in the server, so as to generate an online prediction service. One historical feature set corresponds to one business scenario, and each historical feature set is composed of a plurality of historical original features; and the model entry feature is a feature generated according to each historical feature set, and there is a corresponding relationship between the first file and the second file.

Figure 5:
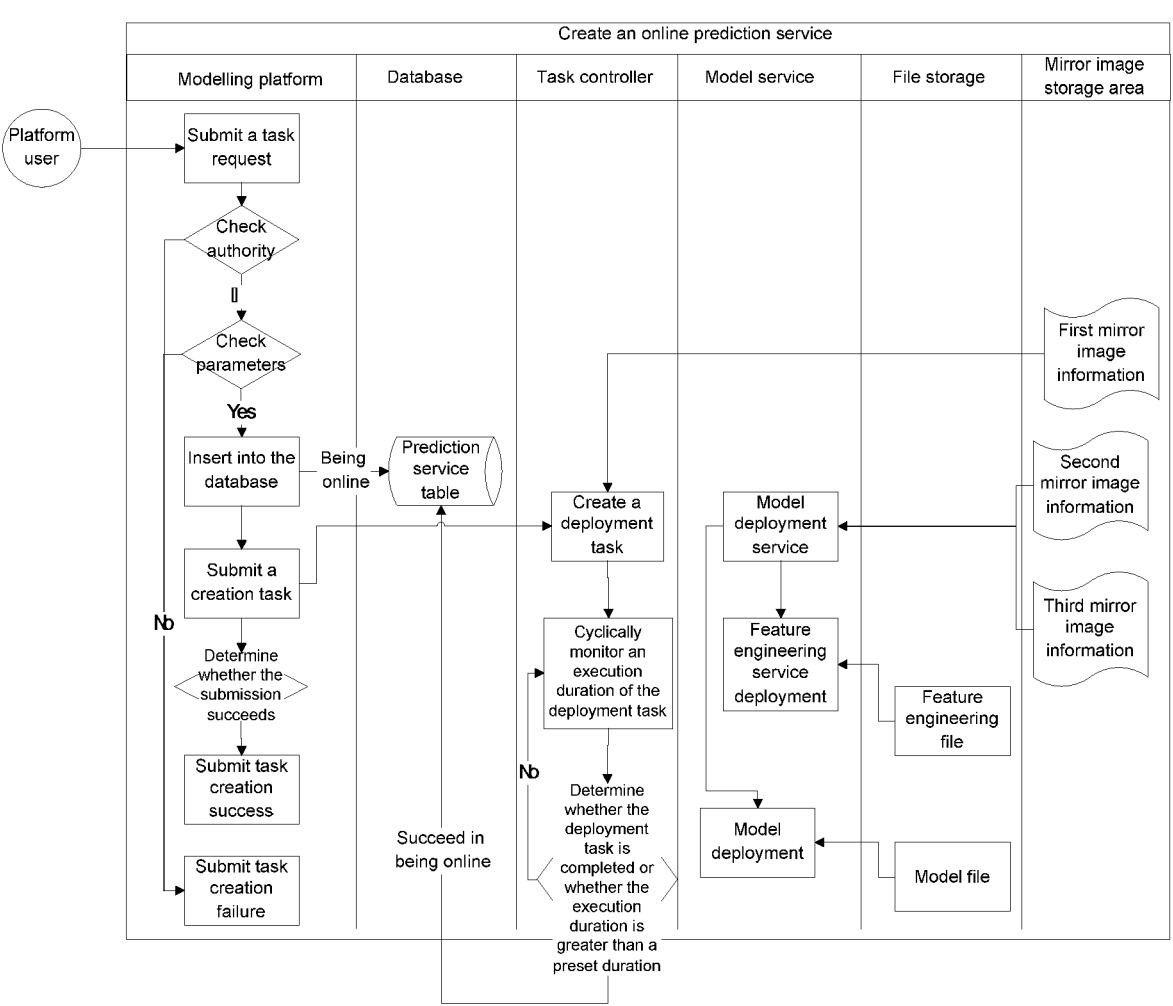
FIG. 5 is a flow diagram of creating an online prediction service according to Embodiment 2 of the present disclosure.

Optionally, FIG. 5 is a flow diagram of creating the online prediction service according to Embodiment 2 of the present disclosure. As shown in FIG. 5, the model obtained by training on the basis of the historical feature set may be stored in the server in the form of a model file (i.e., the first file), and the feature engineering service corresponding to each model may be stored in the server in the form of a feature engineering file (i.e., the second file), wherein there is a corresponding relationship between the feature engineering file and the model file. The feature engineering service is a program that is generated after coding processing is performed on the generation process of model entry features, and by means of the feature engineering service, the model entry features may be automatically generated on the basis of the original features.

It should be noted that, when a plurality of models are obtained by training, the feature engineering service corresponding to each model is generated at the same time. Since the feature engineering service can perform automatic feature processing on the original features in real time, a modeling process can be seamlessly linked with a prediction process in the present disclosure, therefore after a new model is released, the server can directly call the corresponding feature engineering service to process the target original feature, so as to generate the target model entry feature, without the need for a technician to spend a lot of time processing the original features to change the same into the model entry features, such that the processing efficiency of the model entry features is improved.

In an optional embodiment, first mirror image information is acquired from a preset mirror image storage area, then a deployment task of the online prediction service is generated according to the first mirror image information, and finally, according to the deployment task, the first file and the second file, each model and the feature engineering service corresponding to each model are deployed in the server in a one-to-one correspondence manner, so as to generate the online prediction service, wherein the first mirror image information at least includes a plurality of execution instructions for generating the online prediction service.

Optionally, as shown in FIG. 5, a platform user submits a task request of creating an online prediction service on a modeling platform. First, the modeling platform checks whether the platform user has the authority to create the online prediction service, and if so, checks whether parameters of the online prediction service submitted by the platform user are compliant, if so, the modeling platform inserts the task request into a database, and submits a creation task to a task controller. In the case of check failure in any step, submission of the creation task will fail. After receiving the creation task, the task controller acquires first mirror image information from a preset mirror image storage area, and generates a deployment task of the online prediction service on the basis of the first mirror image information, wherein the deployment task includes a plurality of execution instructions for generating the online prediction service, for example, a model deployment service is generated in a model service module by means of the execution instructions in the deployment task.

It should be noted that, by means of generating the deployment task of the online prediction service according to the first mirror image information, the online prediction service can be deployed flexibly and automatically, without the need for manual deployment by the technician, thereby improving the deployment efficiency and the deployment success rate.

In an optional embodiment, the server acquires the first file, the second file, and the corresponding relationship between the first file and the second file, and then acquires second mirror image information and third mirror image information from the preset mirror image storage area according to the deployment task, wherein the second mirror image information represents a feature engineering service deployment mirror image, and the third mirror image information represents a model deployment mirror image. The server parses the first file according to the second mirror image information, so as to obtain the feature engineering service corresponding to each model, parses the second file according to the third mirror image information, so as to obtain each model, and finally deploys, according to the corresponding relationship, each model and the feature engineering service corresponding to each model in the server, so as to generate the online prediction service.

Optionally, as shown in FIG. 5, after generating the model deployment service, the server acquires, according to the model deployment service, the second mirror image information and the third mirror image information from the mirror image storage area, afterwards generates the feature engineering service on the basis of the second mirror image information, and generates the model deployment service on the basis of the third mirror image information. The server may parse the first file by means of the feature engineering service, parse the second file by means of the model deployment service, and finally obtain each model and the feature engineering service corresponding to each model, respectively. Since there is a corresponding relationship between the first file and the second file, the server can deploy each model and each feature engineering service in the server in the one-to-one correspondence manner.

It should be noted that, by means of the second mirror image information and the third mirror image information, the effect of automatically deploying the model and the feature engineering service is realized. In addition, by means of the corresponding relationship, each model is correspondingly deployed with the corresponding feature engineering service, thereby realizing the effect of automatically generating the model entry feature corresponding to each model on the basis of each feature engineering service, and thus ensuring the generation accuracy of the model entry feature.

In an optional embodiment, the server detects an execution duration of the deployment task by means of the task controller, and when the execution duration of the deployment task is greater than a preset duration, determines that the generation of the online prediction service fails.

Optionally, as shown in FIG. 5, the task controller cyclically monitors the execution duration of the deployment task, and determines that the generation of the online prediction service fails once finding that the execution duration is greater than the preset duration. If the execution duration is within the preset duration, the deployment task is completely completed, it is determined that the online prediction service is successfully online, and the online prediction service will be stored in a prediction service table in the database. It should be noted that the modeling platform further determines whether the creation task is submitted successfully.

In the above process, by means of cyclically monitoring the execution duration of the deployment task, an abnormal deployment situation can be discovered in time, thereby improving the resolution efficiency of deployment abnormality, and meanwhile avoiding the problem of online delay of the online prediction service caused by the untimely discovery of the deployment abnormality as much as possible.

Embodiment 3

After each model and each feature engineering service are deployed in the server in the one-to-one correspondence manner, the server may perform automatic feature processing on the original features by means of the feature engineering service.

Figure 6:
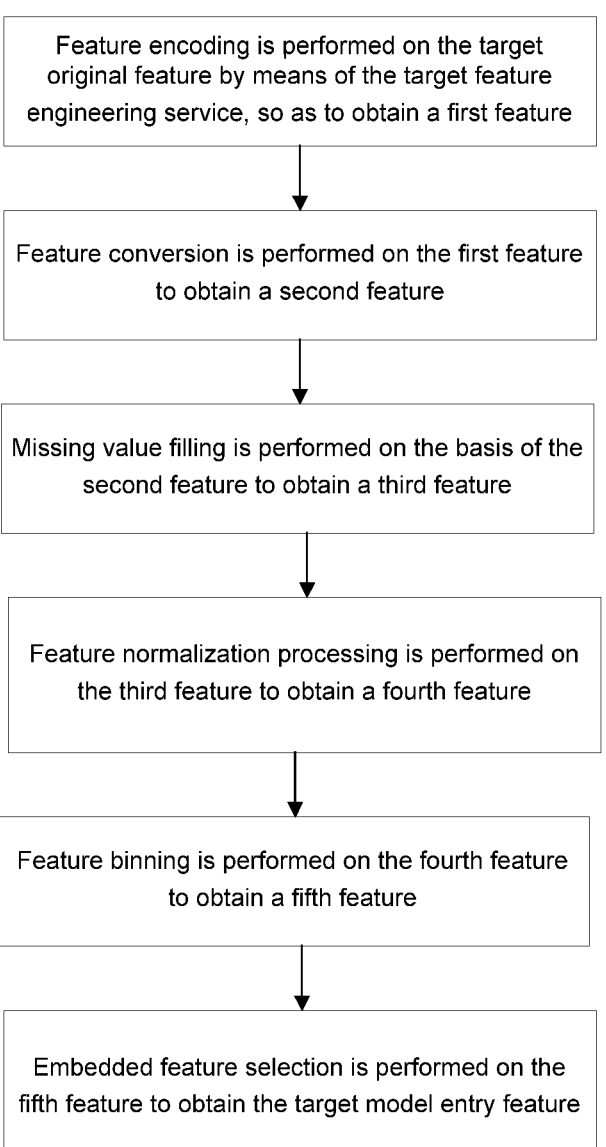
FIG. 6 is a flow diagram of a feature processing process according to Embodiment 3 of the present disclosure.

In an optional embodiment, FIG. 6 is a flow diagram of a feature processing process according to Embodiment 3 of the present disclosure. As shown in FIG. 6, the server performs feature encoding on the target original feature by means of the target feature engineering service, so as to obtain a first feature; performs feature conversion on the first feature to obtain a second feature; performs missing value filling on the basis of the second feature to obtain a third feature; performs feature normalization processing on the third feature to obtain a fourth feature; performs feature binning on the fourth feature to obtain a fifth feature; and performs embedded feature selection on the fifth feature to obtain the target model entry feature.

Optionally, the feature processing process at least includes: feature encoding, feature conversion, missing value filling, feature normalization processing, feature binning, embedded feature selection and other steps. According to specific practical application scenarios, the feature processing process may further include the step of feature onehot (one-bit valid encoding) encoding.

It can be seen from the above content that, by means of performing the automatic feature processing on the target original feature in the online prediction stage, the effect of improving the generation efficiency of the model entry features is realized. In addition, on this basis, in the present disclosure, since it is only necessary to store all original features in real time, and it is not necessary to store all model entry features in real time, the storage pressure and storage cost of the server are reduced, and the query timeliness of the storage engine is also improved.

Embodiment 4

Figure 7:
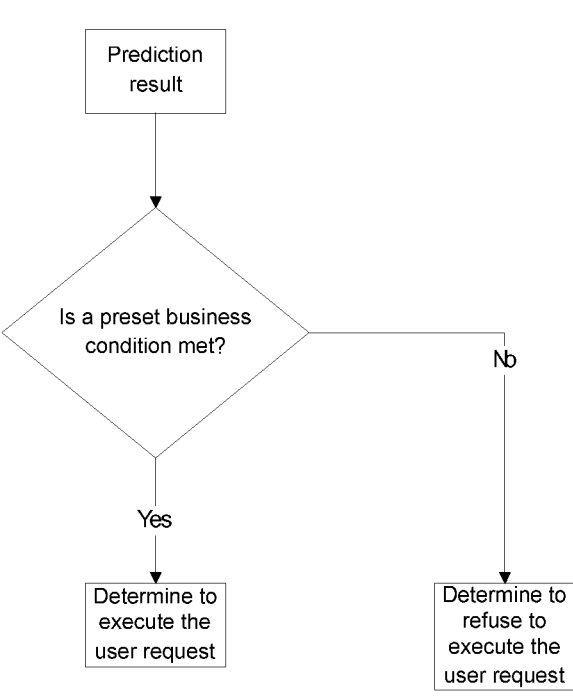
FIG. 7 is a flow diagram of processing a user request according to Embodiment 4 of the present disclosure.

In an optional embodiment, FIG. 7 is a flow diagram of processing a user request according to Embodiment 4 of the present disclosure. As shown in FIG. 7, after inputting the target model entry feature into the target model, so as to obtain the prediction result made by the target model for the user request, when the user request meets the preset business condition in the business scenario, the server determines to execute the user request; and when the user request does not meet the preset business condition in the business scenario, the server determines to refuse to execute the user request.

Optionally, assuming that the business scenario is a business scenario of credit card application, and the preset business condition is a minimum credit score, after the target model entry feature is input into the target model, if the prediction result indicates that the credit score of the user is less than a preset minimum credit score, the server determines to refuse the credit card application request of the user; and if the prediction result indicates that the credit score of the user is greater than or equal to the preset minimum credit score, the server determines to execute the credit card application request of the user.

By means of the above process, real-time anti-fraud prediction can be performed for financial scenarios such as loans and credit cards, thereby realizing the effect of identifying potential financial risks in time.

In an optional embodiment, after inputting the target model entry feature into the target model, so as to obtain the prediction result made by the target model for the user request, when the user request meets the preset business condition in the business scenario, the server pushes the information of a target product to a terminal device; and when the user request does not meet the preset business condition in the business scenario, the server prohibits to push the information of the target product to the terminal device.

Optionally, assuming that the business scenario is a marketing scenario of the target product, and the preset business condition is a minimum browsing duration of the user on an introduction interface of the target product, after the target model entry feature is input into the target model, if the prediction result indicates that the browsing duration of the user on the introduction interface of the target product is less than a preset minimum browsing duration, the server prohibits to push the information of the target product to the terminal device of the user; and if the prediction result indicates that the browsing duration of the user on the introduction interface of the target product is greater than or equal to the preset minimum browsing duration, the server pushes the information of the target product to the terminal device of the user.

By means of the above process, real-time prediction can be performed for the marketing scenario, thereby realizing the effect of identifying potential consumers in time.

Embodiment 5

Figure 8:
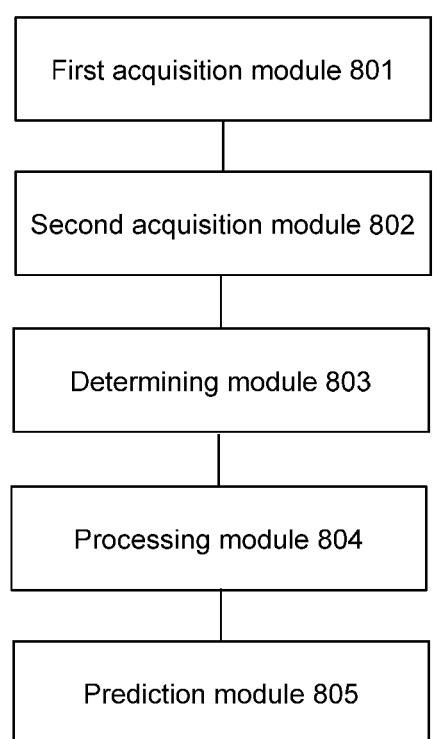
FIG. 8 is a schematic diagram of a real-time prediction apparatus according to Embodiment 5 of the present disclosure.

According to an embodiment of the present disclosure, an embodiment of a real-time prediction apparatus is further provided, wherein FIG. 8 is a schematic diagram of a real-time prediction apparatus according to Embodiment 5 of the present disclosure. The apparatus includes: a first acquisition module 801, configured to acquire a user request based on a business scenario, wherein the user request at least includes a user identifier and a scenario identifier of the business scenario; a second acquisition module 802, configured to acquire, from a plurality of pre-stored original features, at least one target original feature corresponding to the user identifier; a determining module 803, configured to determine, from a plurality of pre-trained models, a target model corresponding to the scenario identifier, and determine, from a plurality of feature engineering services, a target feature engineering service corresponding to the target model; a processing module 804, configured to perform real-time feature processing on the at least one target original feature by means of the target feature engineering service, so as to obtain a target model entry feature; and a prediction module 805, configured to input the target model entry feature into the target model, so as to obtain a prediction result made by the target model for the user request, wherein the prediction result is used for representing whether the user request meets a preset business condition in the business scenario.

It should be noted that, the above first acquisition module 801, the second acquisition module 802, the determining module 803, the processing module 804 and the prediction module 805 correspond to step S101 to step S101 S105 in the above embodiment, and the five modules implement the same examples and application scenarios as the corresponding steps, but are not limited to the content disclosed in the above Embodiment 1.

Optionally, the real-time prediction apparatus further includes: a third acquisition module, a storage module, a coding processing module, and a deployment module, wherein the third acquisition module is configured to acquire a plurality of historical feature sets, one historical feature set corresponds to one business scenario, and each historical feature set is composed of a plurality of historical original features; the storage module is configured to perform training according to each historical feature set, so as to obtain a model corresponding to each business scenario, and store the model in a first file; the coding processing module is configured to perform coding processing on the generation process of model entry features, so as to obtain a feature engineering service corresponding to each model, and store the feature engineering service in a second file, wherein the model entry feature is a feature generated according to each historical feature set, and there is a corresponding relationship between the first file and the second file; and the deployment module is configured to, on the basis of the first file and the second file, deploy the feature engineering service corresponding to each model and each model in a server, so as to generate an online prediction service.

Optionally, the above deployment module further includes: a fourth acquisition module, a generation module, and a first deployment module, wherein the fourth acquisition module is configured to acquire first mirror image information from a preset mirror image storage area, wherein the first mirror image information at least includes a plurality of execution instructions for generating the online prediction service; the generation module is configured to generate a deployment task of the online prediction service according to the first mirror image information; and the first deployment module is configured to, according to the deployment task, the first file and the second file, deploy each model and the feature engineering service corresponding to each model in the server in a one-to-one correspondence manner, so as to generate the online prediction service.

Optionally, the above first deployment module further includes: a fifth acquisition module, a sixth acquisition module, a first parsing module, a second parsing module, and a second deployment module, wherein the fifth acquisition module is configured to acquire the first file, the second file, and the corresponding relationship between the first file and the second file; the sixth acquisition module is configured to acquire second mirror image information and third mirror image information from the preset mirror image storage area according to the deployment task, wherein the second mirror image information represents a feature engineering service deployment mirror image, and the third mirror image information represents a model deployment mirror image; the first parsing module is configured to parse the first file according to the second mirror image information, so as to obtain the feature engineering service corresponding to each model; the second parsing module is configured to parse the second file according to the third mirror image information, so as to obtain each model; and the second deployment module is configured to deploy, according to the corresponding relationship, each model and the feature engineering service corresponding to each model in the server in the one-to-one correspondence manner, so as to generate the online prediction service.

Optionally, the request prediction apparatus further includes: a detection module and a first determining module, wherein the detection module is configured to detect an execution duration of the deployment task; and the first determining module is configured to, when the execution duration of the deployment task is greater than a preset duration, determine that the generation of the online prediction service fails.

Optionally, the above processing module further includes: a feature encoding module, a feature conversion module, a missing value filling module, a feature normalization processing module, a feature binning module, and an embedded feature selection module, wherein the feature encoding module is configured to perform feature encoding on the target original feature by means of the target feature engineering service, so as to obtain a first feature; the feature conversion module is configured to perform feature conversion on the first feature to obtain a second feature; the missing value filling module is configured to perform missing value filling on the basis of the second feature to obtain a third feature; the feature normalization processing module is configured to perform feature normalization processing on the third feature to obtain a fourth feature; the feature binning module is configured to perform feature binning on the fourth feature to obtain a fifth feature; and the embedded feature selection module is configured to perform embedded feature selection on the fifth feature to obtain the target model entry feature.

Optionally, the request prediction apparatus further includes: a second determining module and a third determining module, wherein the second determining module is configured to, when the user request meets the preset business condition in the business scenario, determine to execute the user request; and the third determining module is configured to, when the user request does not meet the preset business condition in the business scenario, determine to refuse to execute the user request.

Optionally, the request prediction apparatus further includes: a push module and a push prohibition module, wherein the push module is configured to, when the user request meets the preset business condition in the business scenario, push the information of a target product to a terminal device; and the push prohibition module is configured to, when the user request does not meet the preset business condition in the business scenario, prohibit to push the information of the target product to the terminal device.

Embodiment 6

According to another aspect of the embodiments of the present disclosure, a non-transitory computer-readable storage medium storing a computer instruction is further provided, wherein the computer instruction is used for causing a computer to execute the real-time prediction method in the above Embodiment 1.

Embodiment 7

According to another aspect of the embodiments of the present disclosure, a computer program product is further provided, including a computer program, wherein when executed by a processor, the computer program implements the real-time prediction method in the above Embodiment 1.

Embodiment 8

According to another aspect of the embodiments of the present disclosure, an electronic device is further provided, including at least one processor; and a memory in communication connection with the at least one processor, wherein the memory stores an instruction executable by the at least one processor, and the instruction is executed by the at least one processor, such that the at least one processor may execute the real-time prediction method in the above Embodiment 1.

Figure 9:
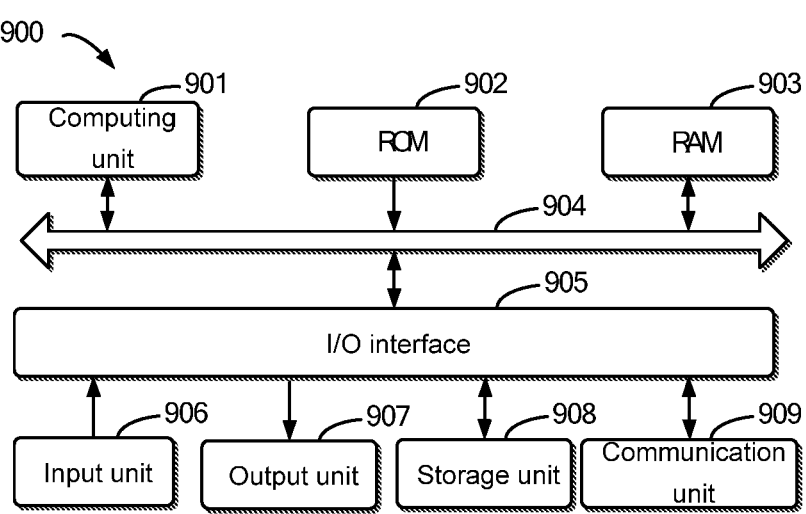
FIG. 9 is a block diagram of an electronic device for implementing the real-time prediction method in an embodiment of the present disclosure.

FIG. 9 shows a schematic block diagram of an example electronic device 900 that may be used for implementing the embodiments of the present disclosure. The electronic device is intended to represent various forms of digital computers, such as laptop computers, desktop computer, workstations, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are by way of example only, and are not intended to limit the implementations of the present disclosure described and/or claimed herein.

As shown in FIG. 9, the device 900 includes a computing unit 901, which may execute various appropriate actions and processing according to a computer program that is stored in a read-only memory (ROM) 902 or a computer program that is loaded from a storage unit 908 into a random access memory (RAM) 903. In the RAM 903, various programs and data necessary for the operations of the device 900 may also be stored. The computing unit 901, the ROM 902 and the RAM 903 are connected to each other by means of a bus 904. An input/output (I/O) interface 905 is also connected to the bus 904.

A plurality of components in the device 900 are connected to the I/O interface 905, including an input unit 906, such as a keyboard and a mouse; an output unit 907, such as various types of displays and loudspeakers; a storage unit 908, such as a magnetic disk and an optical disk; and a communication unit 909, such as a network card, a modem and a wireless communication transceiver. The communication unit 909 allows the device 900 to exchange information/data with other devices by means of a computer network such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various special-purpose artificial intelligence (AI) computing chips, various computing units for running machine learning model algorithms, a digital signal processor (DSP), and any suitable processor, controller, micro-controller, etc. The computing unit 901 executes the various methods and processes described above, such as the real-time prediction method. For example, in some embodiments, the real-time prediction method may be implemented as a computer software program, which is tangibly embodied on a machine-readable medium, such as the storage unit 908. In some embodiments, part or all computer programs may be loaded and/or installed on the device 900 via the ROM 902 and/or the communication unit 909. When the computer programs are loaded into RAM 903 and are executed by the computing unit 901, one or more steps of the real-time prediction method described above may be executed. Alternatively, in other embodiments, the computing unit 901 may be configured to execute the real-time prediction method by means of any other suitable manners (e.g., by means of firmware).

Various embodiments of the systems and techniques described herein above may be implemented in a digital electronic circuit system, an integrated circuit system, a field-programmable gate array (FPGA), an application-specific integrated circuit (ASIC), an application specific standard product (ASSP), a system on chip (SOC), a load programmable logic device (CPLD), computer hardware, firmware, software, and/or combinations thereof. These various embodiments may include being implemented in one or more computer programs, the one or more computer programs are executable and/or interpretable on a programmable system including at least one programmable processor, the programmable processor may be a special-purpose or general-purpose programmable processor, which may receive data and instructions from a storage system, at least one input apparatus and at least one output apparatus, and transmit the data and instructions to the storage system, the at least one input apparatus and the at least one output apparatus.

Program codes for implementing the method of the present disclosure may be written in any combination of one or more programming languages. These program codes may be provided for a general-purpose computer, a special-purpose computer or processors or controllers of other programmable data processing apparatuses, such that the program codes, when executed by the processors or controllers, implement specified functions/operations in the flow diagrams and/or block diagrams. The program codes may be completely executed on a machine, partly on the machine, partly on the machine and partly on a remote machine as a stand-alone software package, or completely on the remote machine or a server.

In the context of the present disclosure, a machine-readable medium may be a tangible medium, which may contain or store a program for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of the foregoing content. More specific examples of the machine-readable storage medium include one or more wire-based electrical connections, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the foregoing content.

In order to provide interaction with the user, the systems and techniques described herein may be implemented on a computer, wherein the computer includes: a display apparatus (e.g., a CRT (cathode-ray tube) or an LCD (liquid crystal display) monitor) for displaying information to the user; and a keyboard and pointing apparatus (e.g., a mouse or a trackball), through which the user may provide an input for the computer. Other kinds of apparatuses may also be used for providing interaction with the user. For example, a feedback provided for the user may be any form of sensory feedback (e.g., visual feedback, auditory feedback, or tactile feedback); and the input from the user may be received in any form (including acoustic input, voice input, or tactile input).

The systems and techniques described herein may be implemented in a computing system (e.g., as a data server) that includes a background component, or a computing system (e.g., an application server) that includes a middleware component, or a computing system (e.g., a user computer having a graphical user interface or a web browser, through which the user may interact with the embodiments of the systems and techniques described herein) that includes a front-end component, or a computing system that includes any combination of the background component, the middleware component or the front-end component. The components of the system may be connected to each other by any form or medium of digital data communication (e.g., a communication network). Examples of the communication network include: a local area network (LAN), wide area network (WAN), and the Internet.

The computer system may include a client and a server. The client and the server are generally remote from each other and usually interact with each other by means of the communication network. The relationship between the client and the server is generated by computer programs, which run on respective computers and have a client-server relationship to each other. The server may be a cloud server, a server of a distributed system, or a server combined with a blockchain.

It should be understood that, the steps may be reordered, added or deleted by using the various forms of flow shown above. For example, the various steps described in the present disclosure may be executed in parallel, in sequence or in different sequences, as long as the desired results of the technical solutions disclosed in the present disclosure may be realized, which is not limited herein.

The above specific embodiments do not constitute limitations on the protection scope of the present disclosure. Those skilled in the art should be aware that, various modifications, combinations, sub-combinations and substitutions may be made according to design requirements and other factors. Any modifications, equivalent replacements, improvements and the like, made within the spirit and principles of the present disclosure, should be included within the protection scope of the present disclosure.

What is claimed is:

1. A real-time prediction method, comprising:
acquiring, by a server by means of a gateway, a user request based on a business scenario, wherein the user request at least comprises a user identifier and a scenario identifier of the business scenario;
acquiring, by the server by calling a model query service, from a plurality of pre-stored original features, at least one target original feature corresponding to the user identifier, wherein the plurality of pre-stored original features is stored in an offline database of the server;
determining, by the server, from a plurality of pre-trained models, a target model corresponding to the scenario identifier, and determining, from a plurality of feature engineering services, a target feature engineering service corresponding to the target model;
transmitting, by the server, the least one target original feature to the target feature engineering service in a traffic proxy manner, performing real-time feature processing on the at least one target original feature by means of the target feature engineering service, so as to obtain a target model entry feature;
inputting, by the server, the target model entry feature into the target model, so as to obtain an online prediction result made by the target model for the user request, wherein the online prediction result is used for representing whether the user request meets a preset business condition in the business scenario;
acquiring, by the server, first mirror image information from a preset mirror image storage area, wherein the first mirror image information at least comprises a plurality of execution instructions for generating a online prediction service;
generating, by the server, a deployment task of the online prediction service according to the first mirror image information; and
according to the deployment task, a first file and a second file, deploying, by the server, each model and the feature engineering service corresponding to each model in the server in a one-to-one correspondence manner, so as to generate the online prediction service, wherein the first file is configured to store a model corresponding to each business scenario, and the second file is configured to store a feature engineering service corresponding to each model.

2. The method according to claim 1, wherein before determining, from the plurality of pre-trained models, the target model corresponding to the scenario identifier, and determining, from the plurality of feature engineering services, the target feature engineering service corresponding to the target model, the method further comprises:
acquiring a plurality of historical feature sets, wherein one historical feature set corresponds to one business scenario, and each historical feature set is composed of a plurality of historical original features;
performing training according to each historical feature set, so as to obtain a model corresponding to each business scenario, and storing the model in a first file;
performing coding processing on generation process of model entry features, so as to obtain a feature engineering service corresponding to each model, and storing the feature engineering service in a second file, wherein the model entry feature is a feature generated according to each historical feature set, and there is a corresponding relationship between the first file and the second file; and
on the basis of the first file and the second file, deploying the feature engineering service corresponding to each model and each model in a server, so as to generate an online prediction service.

3. The method as claimed in claim 1, wherein the step of according to the deployment task, the first file and the second file, deploying each model and the feature engineering service corresponding to each model in the server in the one-to-one correspondence manner, so as to generate the online prediction service comprises:
acquiring the first file, the second file, and the corresponding relationship between the first file and the second file;
acquiring second mirror image information and third mirror image information from the preset mirror image storage area according to the deployment task, wherein the second mirror image information represents a feature engineering service deployment mirror image, and the third mirror image information represents a model deployment mirror image;
parsing the first file according to the second mirror image information, so as to obtain the feature engineering service corresponding to each model;
parsing the second file according to the third mirror image information, so as to obtain each model; and
deploying, according to the corresponding relationship, each model and the feature engineering service corresponding to each model in the server in the one-to-one correspondence manner, so as to generate the online prediction service.

4. The method as claimed in claim 1, wherein the method further comprises:
detecting an execution duration of the deployment task; and
when the execution duration of the deployment task is greater than a preset duration, determining that the generation of the online prediction service fails.

5. The method according to claim 1, wherein the step of performing real-time feature processing on the at least one target original feature by means of the target feature engineering service, so as to obtain the target model entry feature comprises:

performing feature encoding on the target original feature by means of the target feature engineering service, so as to obtain a first feature;

performing feature conversion on the first feature to obtain a second feature;

performing missing value filling on the basis of the second feature to obtain a third feature;

performing feature normalization processing on the third feature to obtain a fourth feature;

performing feature binning on the fourth feature to obtain a fifth feature; and performing embedded feature selection on the fifth feature to obtain the target model entry feature.

6. The method according to claim 1, wherein after inputting the target model entry feature into the target model, so as to obtain the prediction result made by the target model for the user request, the method further comprises:

when the user request meets the preset business condition in the business scenario, determining to execute the user request; and when the user request does not meet the preset business condition in the business scenario, determining to refuse to execute the user request.

7. The method according to claim 1, wherein after inputting the target model entry feature into the target model, so as to obtain the prediction result made by the target model for the user request, the method further comprises:

when the user request meets the preset business condition in the business scenario, pushing the information of a target product to a terminal device; and when the user request does not meet the preset business condition in the business scenario, prohibiting to push the information of the target product to the terminal device.

8. An electronic device, wherein the electronic device is a server, and the server comprises:

at least one processor; and a memory in communication connection with the at least one processor, wherein, the memory stores an instruction executable by the at least one processor, and the instruction is executed by the at least one processor, such that the at least one processor may execute the following actions:

acquiring, by the server by means of a gateway, a user request based on a business scenario, wherein the user request at least comprises a user identifier and a scenario identifier of the business scenario;

acquiring, by the server by calling a model query service, from a plurality of pre-stored original features, at least one target original feature corresponding to the user identifier, wherein the plurality of pre-stored original features is stored in an offline database of the server, determining, by the server, from a plurality of pre-trained models, a target model corresponding to the scenario identifier, and determining, from a plurality of feature engineering services, a target feature engineering service corresponding to the target model;

transmitting, by the server, the least one target original feature to the target feature engineering service in a traffic proxy manner, performing real-time feature processing on the at least one target original feature by means of the target feature engineering service, so as to obtain a target model entry feature;

inputting, by the server, the target model entry feature into the target model, so as to obtain an online prediction result made by the target model for the user request, wherein the online prediction result is used for representing whether the user request meets a preset business condition in the business scenario;

acquiring, by the server, first mirror image information from a preset mirror image storage area, wherein the first mirror image information at least comprises a plurality of execution instructions for generating a online prediction service;

generating, by the server, a deployment task of the online prediction service according to the first mirror image information; and according to the deployment task, a first file and a second file, deploying, by the server, each model and the feature engineering service corresponding to each model in the server in a one-to-one correspondence manner, so as to generate the online prediction service, wherein the first file is configured to store a model corresponding to each business scenario, and the second file is configured to store a feature engineering service corresponding to each model.

9. The electronic device according to claim 8, wherein before determining, from the plurality of pre-trained models, the target model corresponding to the scenario identifier, and determining, from the plurality of feature engineering services, the target feature engineering service corresponding to the target model, further comprising:

acquiring a plurality of historical feature sets, wherein one historical feature set corresponds to one business scenario, and each historical feature set is composed of a plurality of historical original features;

performing training according to each historical feature set, so as to obtain a model corresponding to each business scenario, and storing the model in a first file;

performing coding processing on generation process of model entry features, so as to obtain a feature engineering service corresponding to each model, and storing the feature engineering service in a second file, wherein the model entry feature is a feature generated according to each historical feature set, and there is a corresponding relationship between the first file and the second file; and on the basis of the first file and the second file, deploying the feature engineering service corresponding to each model and each model in a server, so as to generate an online prediction service.

10. The electronic device according to claim 8, wherein the step of according to the deployment task, the first file and the second file, deploying each model and the feature engineering service corresponding to each model in the server in the one-to-one correspondence manner, so as to generate the online prediction service comprises:

acquiring the first file, the second file, and the corresponding relationship between the first file and the second file;

acquiring second mirror image information and third mirror image information from the preset mirror image storage area according to the deployment task, wherein the second mirror image information represents a feature engineering service deployment mirror image, and the third mirror image information represents a model deployment mirror image;

parsing the first file according to the second mirror image information, so as to obtain the feature engineering service corresponding to each model;

parsing the second file according to the third mirror image information, so as to obtain each model; and deploying, according to the corresponding relationship, each model and the feature engineering service corresponding to each model in the server in the one-to-one correspondence manner, so as to generate the online prediction service.

11. The electronic device according to claim 8, further comprising:

detecting an execution duration of the deployment task; and when the execution duration of the deployment task is greater than a preset duration, determining that the generation of the online prediction service fails.

12. The electronic device according to claim 8, wherein the step of performing real-time feature processing on the at least one target original feature by means of the target feature engineering service, so as to obtain the target model entry feature comprises:

performing feature encoding on the target original feature by means of the target feature engineering service, so as to obtain a first feature;

performing feature conversion on the first feature to obtain a second feature;

performing missing value filling on the basis of the second feature to obtain a third feature;

performing feature normalization processing on the third feature to obtain a fourth feature;

performing feature binning on the fourth feature to obtain a fifth feature; and performing embedded feature selection on the fifth feature to obtain the target model entry feature.

13. The electronic device according to claim 8, wherein after inputting the target model entry feature into the target model, so as to obtain the prediction result made by the target model for the user request, further comprising:

when the user request meets the preset business condition in the business scenario, determining to execute the user request; and when the user request does not meet the preset business condition in the business scenario, determining to refuse to execute the user request.

14. The electronic device according to claim 8, wherein after inputting the target model entry feature into the target model, so as to obtain the prediction result made by the target model for the user request, further comprising:

when the user request meets the preset business condition in the business scenario, pushing the information of a target product to a terminal device; and when the user request does not meet the preset business condition in the business scenario, prohibiting to push the information of the target product to the terminal device.

15. A non-transitory computer-readable storage medium storing a computer instruction, wherein the computer instruction is used for causing a server to execute following actions:

acquiring, by the server by means of a gateway, a user request based on a business scenario, wherein the user request at least comprises a user identifier and a scenario identifier of the business scenario;

acquiring, by the server by calling a model query service, from a plurality of pre-stored original features, at least one target original feature corresponding to the user identifier, wherein the plurality of pre-stored original features is stored in an offline database of the server;

determining, by the server, from a plurality of pre-trained models, a target model corresponding to the scenario identifier, and determining, from a plurality of feature engineering services, a target feature engineering service corresponding to the target model;

transmitting, by the server, the least one target original feature to the target feature engineering service in a traffic proxy manner, performing real-time feature processing on the at least one target original feature by means of the target feature engineering service, so as to obtain a target model entry feature;

inputting, by the server, the target model entry feature into the target model, so as to obtain an online prediction result made by the target model for the user request, wherein the online prediction result is used for representing whether the user request meets a preset business condition in the business scenario;

acquiring, by the server, first mirror image information from a preset mirror image storage area, wherein the first mirror image information at least comprises a plurality of execution instructions for generating a online prediction service;

generating, by the server, a deployment task of the online prediction service according to the first mirror image information; and according to the deployment task, a first file and a second file, deploying, by the server, each model and the feature engineering service corresponding to each model in the server in a one-to-one correspondence manner, so as to generate the online prediction service, wherein the first file is configured to store a model corresponding to each business scenario, and the second file is configured to store a feature engineering service corresponding to each model.

16. The non-transitory computer-readable storage medium according to claim 15, wherein before determining, from the plurality of pre-trained models, the target model corresponding to the scenario identifier, and determining, from the plurality of feature engineering services, the target feature engineering service corresponding to the target model, further comprising:

acquiring a plurality of historical feature sets, wherein one historical feature set corresponds to one business scenario, and each historical feature set is composed of a plurality of historical original features;

performing training according to each historical feature set, so as to obtain a model corresponding to each business scenario, and storing the model in a first file;

performing coding processing on generation process of model entry features, so as to obtain a feature engineering service corresponding to each model, and storing the feature engineering service in a second file, wherein the model entry feature is a feature generated according to each historical feature set, and there is a corresponding relationship between the first file and the second file; and on the basis of the first file and the second file, deploying the feature engineering service corresponding to each model and each model in a server, so as to generate an online prediction service.

17. The non-transitory computer-readable storage medium according to claim 15, wherein the step of according to the deployment task, the first file and the second file, deploying each model and the feature engineering service corresponding to each model in the server in the one-to-one correspondence manner, so as to generate the online prediction service comprises:

acquiring the first file, the second file, and the correspond-
  ing relationship between the first file and the second
  file;

acquiring second mirror image information and third
  mirror image information from the preset mirror image
  storage area according to the deployment task, wherein
  the second mirror image information represents a fea-
  ture engineering service deployment mirror image, and
  the third mirror image information represents a model
  deployment mirror image;

parsing the first file according to the second mirror image
  information, so as to obtain the feature engineering
  service corresponding to each model;

parsing the second file according to the third mirror image
  information, so as to obtain each model; and deploying, according to the corresponding relationship,
  each model and the feature engineering service corre-
  sponding to each model in the server in the one-to-one
  correspondence manner, so as to generate the online
  prediction service.

\* \* \* \* \*